United States Patent

Nagata et al.

[11] Patent Number: 5,921,147
[45] Date of Patent: Jul. 13, 1999

[54] STEERING WHEEL MOUNTING ASSEMBLY

[75] Inventors: Atsushi Nagata; Akio Hosoi; Tooru Koyama, all of Aichi, Japan

[73] Assignee: Toyoda Gosei Co., Ltd., Nishikasugai-Gun, Japan

[21] Appl. No.: 09/010,122

[22] Filed: Jan. 21, 1998

Related U.S. Application Data

[62] Division of application No. 08/704,945, Aug. 30, 1996., abandoned

[30] Foreign Application Priority Data

Aug. 31, 1995 [JP] Japan .................................. 7-223972
Oct. 11, 1995 [JP] Japan .................................. 7-263215

[51] Int. Cl.⁶ .................................................. B62D 1/10
[52] U.S. Cl. .............................................. 74/552; 403/359
[58] Field of Search .............................. 74/552; 403/359

[56] References Cited

U.S. PATENT DOCUMENTS

| 4,899,611 | 2/1990 | Pinna | 403/359 X |
| 5,588,337 | 12/1996 | Milton | 74/552 |
| 5,617,763 | 4/1997 | Cymbal | 74/552 |

FOREIGN PATENT DOCUMENTS

| 0475183A1 | 3/1992 | European Pat. Off. |  |
| 1015704 | 9/1957 | Germany . |  |
| 160666 | 9/1984 | Japan | 74/552 |
| 63-134368 | 6/1988 | Japan . |  |
| 2-24691 | 7/1990 | Japan . |  |
| 2-133955 | 11/1990 | Japan . |  |
| 5-2388 | 1/1993 | Japan . |  |
| 655837 | 8/1951 | United Kingdom | 74/552 |
| 2282574 | 4/1995 | United Kingdom . |  |

*Primary Examiner*—John A. Jeffery
*Assistant Examiner*—MaryAnn Battista
*Attorney, Agent, or Firm*—Pillsbury Madison & Sutro LLP

[57] ABSTRACT

A steering wheel body has covering materials for covering a ring core and spoke cores and a pad member integrally formed with the covering materials. An adaptor is fitted to the tip of a steering shaft, the adaptor having an inside serration engaging with the serration of the steering shaft and an outside serration engaging with the serration of a boss member. Moreover, the boss member of a boss plate is provided with a through-hole extending in a direction perpendicular to the axial direction of the steering shaft. A bolt for fastening the adaptor of the steering shaft is screwed into the through-hole.

6 Claims, 9 Drawing Sheets

STEERING WHEEL MOUNTING ASSEMBLY

This is a division of application Ser. No. 08/704,945, filed Aug. 30, 1996 now abandoned.

BACKGROUND OF THE INVENTION

1. Field of the Invention

The present invention relates to a steering wheel mounting assembly for mounting a steering wheel to a steering shaft.

2. Description of Related Art

A steering wheel comprises an annular ring member, a pad member disposed in the center of the ring member, and spoke members for connecting the ring and pad members. A ring core is embedded in the ring member and so are spoke cores in the respective spoke members. In this case, the ring and spoke cores are covered with a covering material such as foamed urethane. Further, a boss plate for securing a steering shaft is coupled to the spoke cores beneath the pad member.

On the other hand, there has recently been proposed a steering wheel free from the boundary line between the covering material and the pad member by integrally forming the covering material and the pad member for improvement in design (e.g., Japanese Utility Model Publication No. Hei. 2-133955).

The aforementioned steering wheel has been increasingly used for improvement in design. However, there has been a problem in that it is difficult to tighten the nut of the boss plate from above such that the boss plate is coupled to the spoke cores, since the pad member is not removable from the covering material used for the ring and spoke cores. Therefore, there has developed a demand for a new mounting assembly ensuring that a steering wheel is readily mounted onto its steering shaft even in such a state that a boss plate has been coupled to spoke cores, that is, the steering wheel has been assembled completely.

The number of serration teeth formed on the steering wheel or steering shaft side may vary depending on the specification requirements. Even in such a case, however, there is still a persistent demand for reduced cost steering-wheel mounts without, for example, requiring significant or any design changes.

SUMMARY OF THE INVENTION

In view of the foregoing problems, an object of the present invention is to provide a steering wheel mounting assembly for mounting a steering wheel onto a steering shaft surely and readily while achieving cost reduction, wherein the steering wheel integrally incorporates not only covering materials for covering a ring core and spoke cores but also a pad member.

According to the present invention, there is provided a steering wheel mounting assembly for mounting a steering wheel onto a steering shaft, comprising: a boss member having a steering-shaft receiving hole passing therethrough, a first serration formed in the receiving hole; a second serration formed in the end portion of the steering shaft; and a substantially cylindrical adaptor. The adaptor has an outside serration formed on the outer peripheral surface thereof and engages with the first serration. An inside serration is formed on the inner peripheral surface of the adaptor and engages with the second serration. Means are provided for fastening one of a part of the steering wheel shaft and a part of the adaptor to the boss member, the fastening means functioning in a direction transverse to an axis of the shaft.

DETAILED DESCRIPTION OF THE PREFERRED EMBODIMENTS

1st Embodiment

Figure 1:
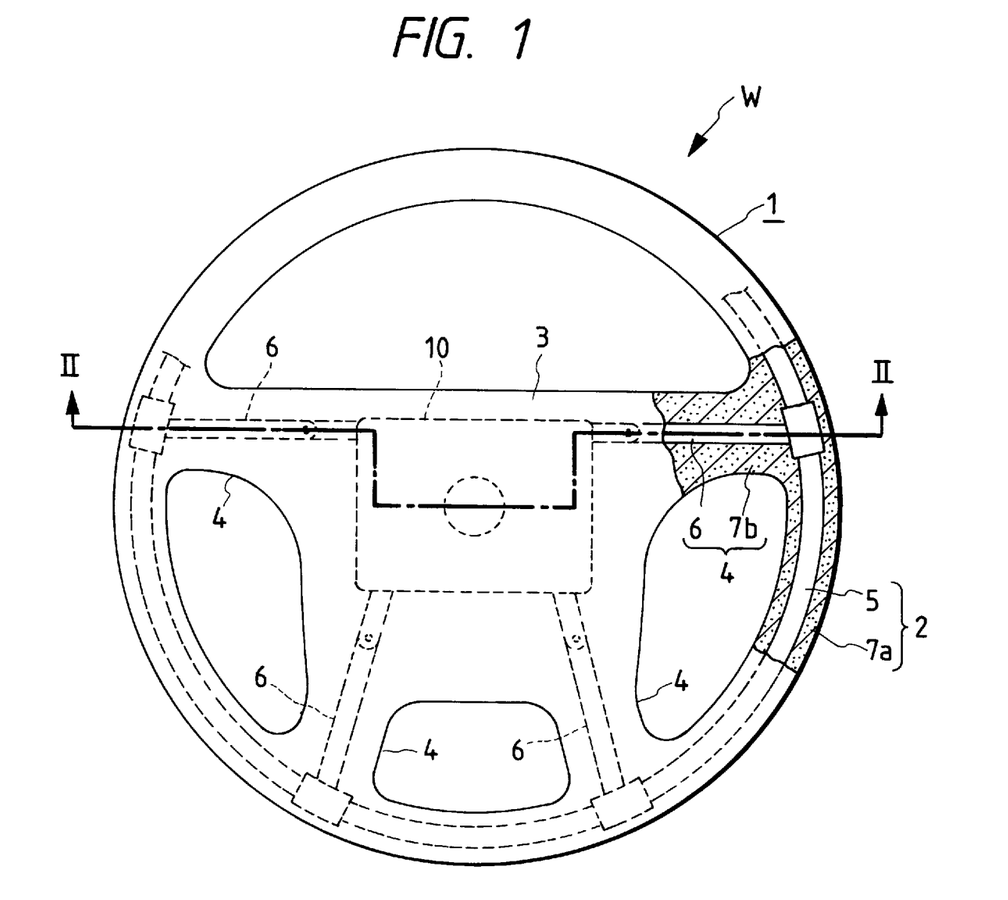
FIG. 1 is a plan view of a steering wheel to which a first embodiment of the present invention is applied.

A description will subsequently be given of a first embodiment of the present invention by reference to the accompanying drawings. FIG. 1 is a plan view of a steering wheel W of the first embodiment and FIG. 2 a sectional view taken along line II—II of FIG. 1.

Figure 2:
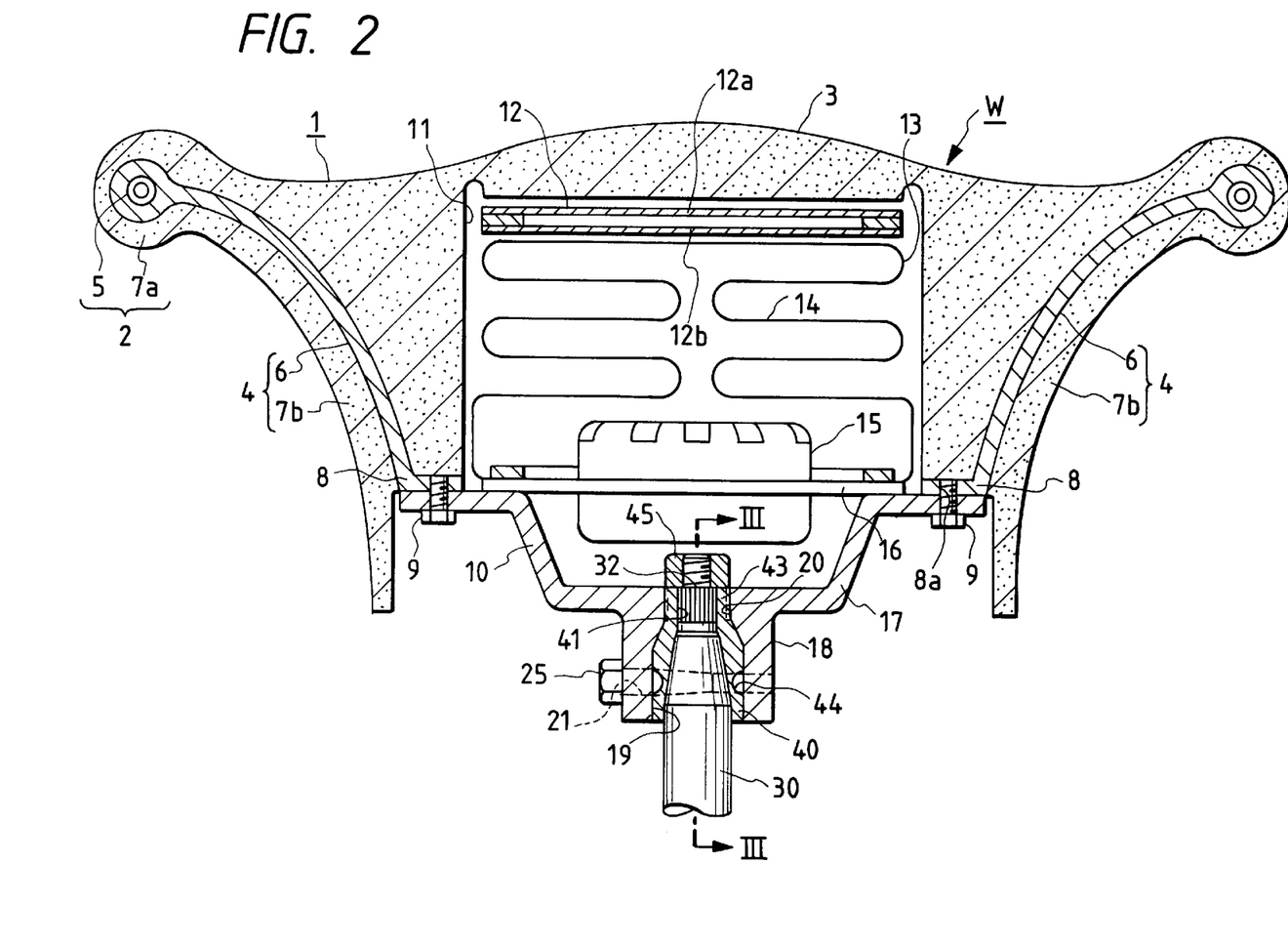
FIG. 2 is a sectional view taken along line II—II of FIG. 1.

In FIGS. 1 and 2, the steering wheel body 1 of a steering wheel W has an annular ring member 2, a pad member 3 disposed in the center of the ring member 2, and four spoke members 4 for coupling the ring member 2 and the pad member 3. Further, the ring member 2 includes a ring core 5 which is, for example, a steel pipe and a covering material 7a for covering the ring core 5, whereas each spoke member 4 includes a spoke core 6 made of, for example, lightweight diecast metal such as aluminum alloy and a covering material 7b for covering the spoke core 6. In this case, soft synthetic resin (e.g., foamed polyurethane) is used for integrally combining the covering materials 7a, 7b and the pad member 3.

As shown in FIG. 2, moreover, the spoke core 6 extends downwardly from the ring core 5 and forms at its lowermost end a flat portion 8 having a female thread 8a. A boss plate 10 for fastening a steering shaft 30 is fastened with a screw 9 to the threads 8a of the flat portion 8 of the spoke core 6. A detailed description will be given of the boss plate 10 later.

On the other hand, a housing recess 11 in the shape of a substantially rectangular prism which is surrounded with the covering material 7b is formed in the undersurface of the pad member 3 and an air bag device 13 as well as a membrane switch 12 is disposed in the housing recess 11. The membrane switch 12 has an upper and a lower thin plate 12a and 12b respectively, forming part of a horn switch circuit (not shown). When the pad member 3 is pressed down, the thin plates 12a, 12b make contact with each other, whereby a horn sounds.

The air bag device 13 includes a folded air bag 14 and an inflator 15 for supplying an inflation gas to the air bag 14. The inflator 15 has a flange member 16, which is fixed to the boss plate 10.

Figure 3:
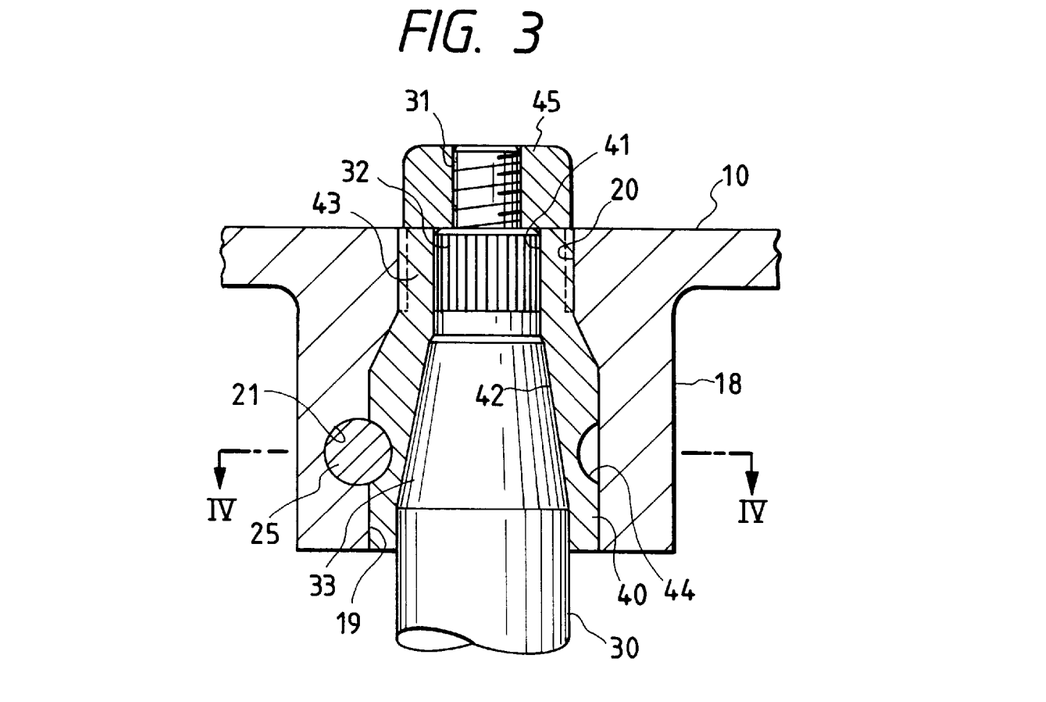
FIG. 3 is a sectional view taken along line III—III of FIG. 2.
Figure 4:
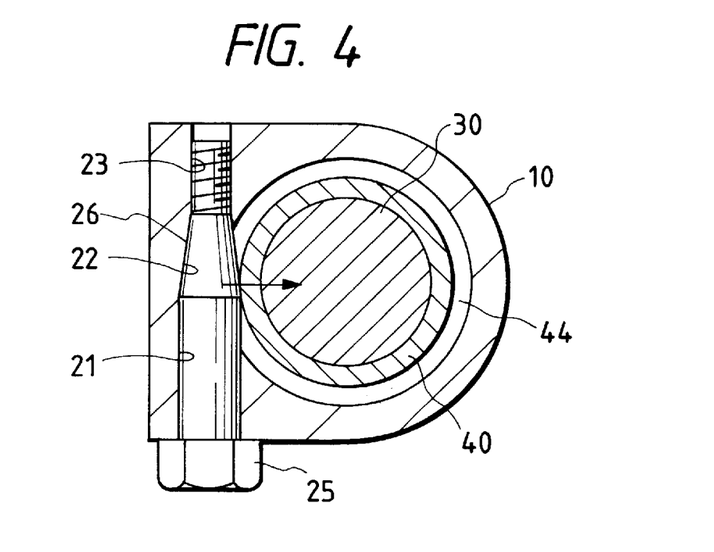
FIG. 4 is a sectional view taken along line IV—IV of FIG. 3.

With reference to FIGS. 3 to 6, a detailed description of a steering-wheel mount together with the boss plate 10 and its peripheral unit is presented below. FIG. 3 is a sectional view taken along line III—III of FIG. 2; FIG. 4 a sectional view taken along line IV—IV of FIG. 3; and FIG. 5 an exploded perspective view of the boss plate 10 and its peripheral unit as viewed from below.

Figure 5:
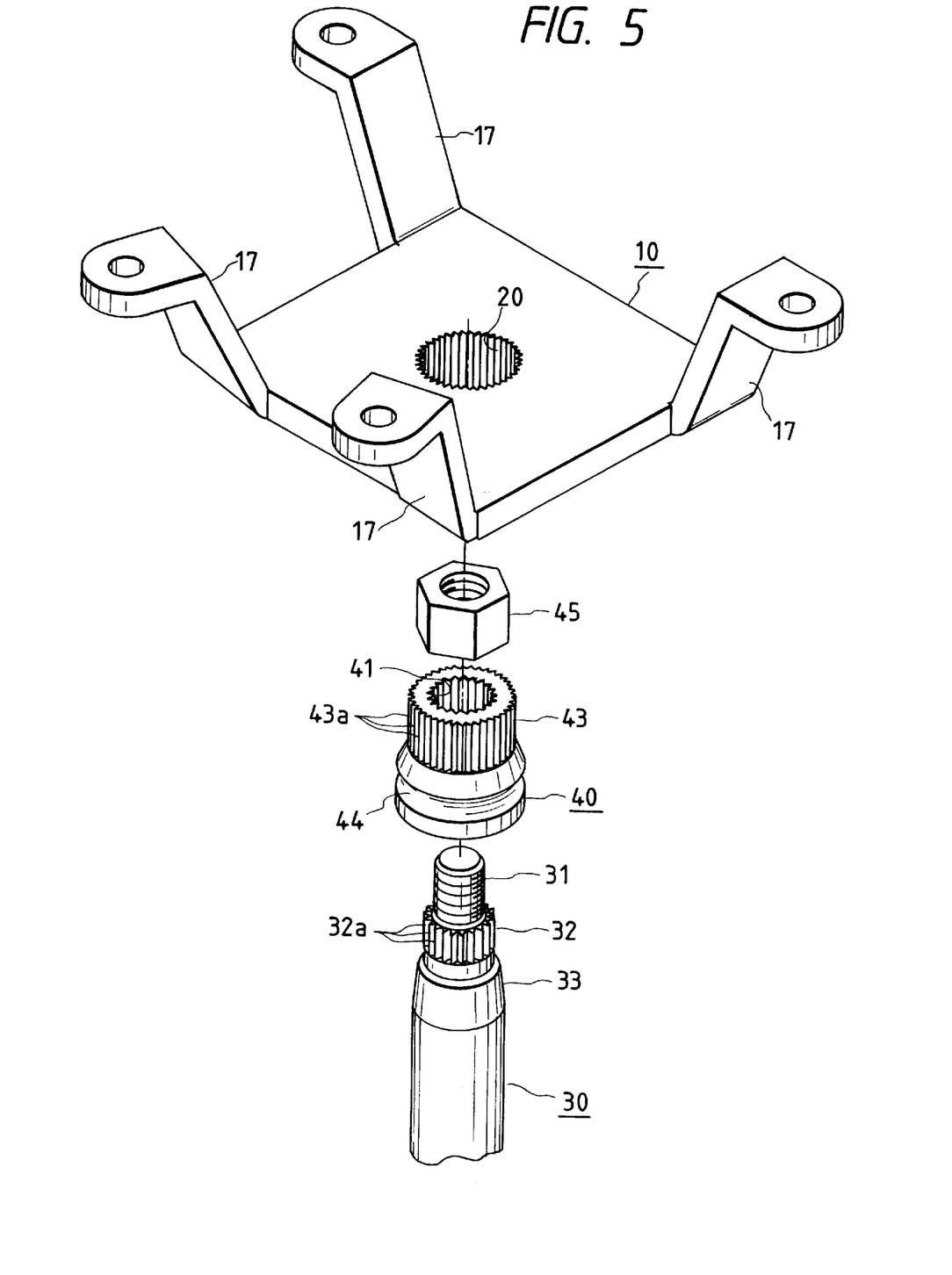
FIG. 5 is an exploded perspective view of a boss plate and its peripheral unit as viewed from above.

As shown in FIGS. 3 and 5, a male thread 31 is formed at the tip of the steering shaft 30 and a serration 32 as well as a tapered surface 33 is formed thereunder. Further, the serration 32 of the steering shaft 30 has a predetermined number of teeth 32a (generally, about 30 teeth). Further, the tip of the steering shaft 30 is fitted into a steel adaptor 40, which is fixed by means of a nut 45 screwed into the male thread 31.

The adaptor 40 is substantially cylindrical and its inner peripheral surface is formed with a serration 41 and a tapered surface 42 corresponding to the serration 32 and the tapered surface 33 of the steering shaft 30. Further, the outer peripheral surface of the adaptor 40 is formed with a serration 43 having more teeth 43a (the number of teeth= about 60) than the serration 32 of the steering shaft 30. Incidentally, the serration 41 on the inner peripheral surface of the adaptor 40 will be hereinafter called an inside serration, and the serration 43 on the outer peripheral surface thereof an outside serration. Further, an annular depression 44 which is arcuate in cross-section is formed under the outside serration of the adaptor 40.

Figure 6:
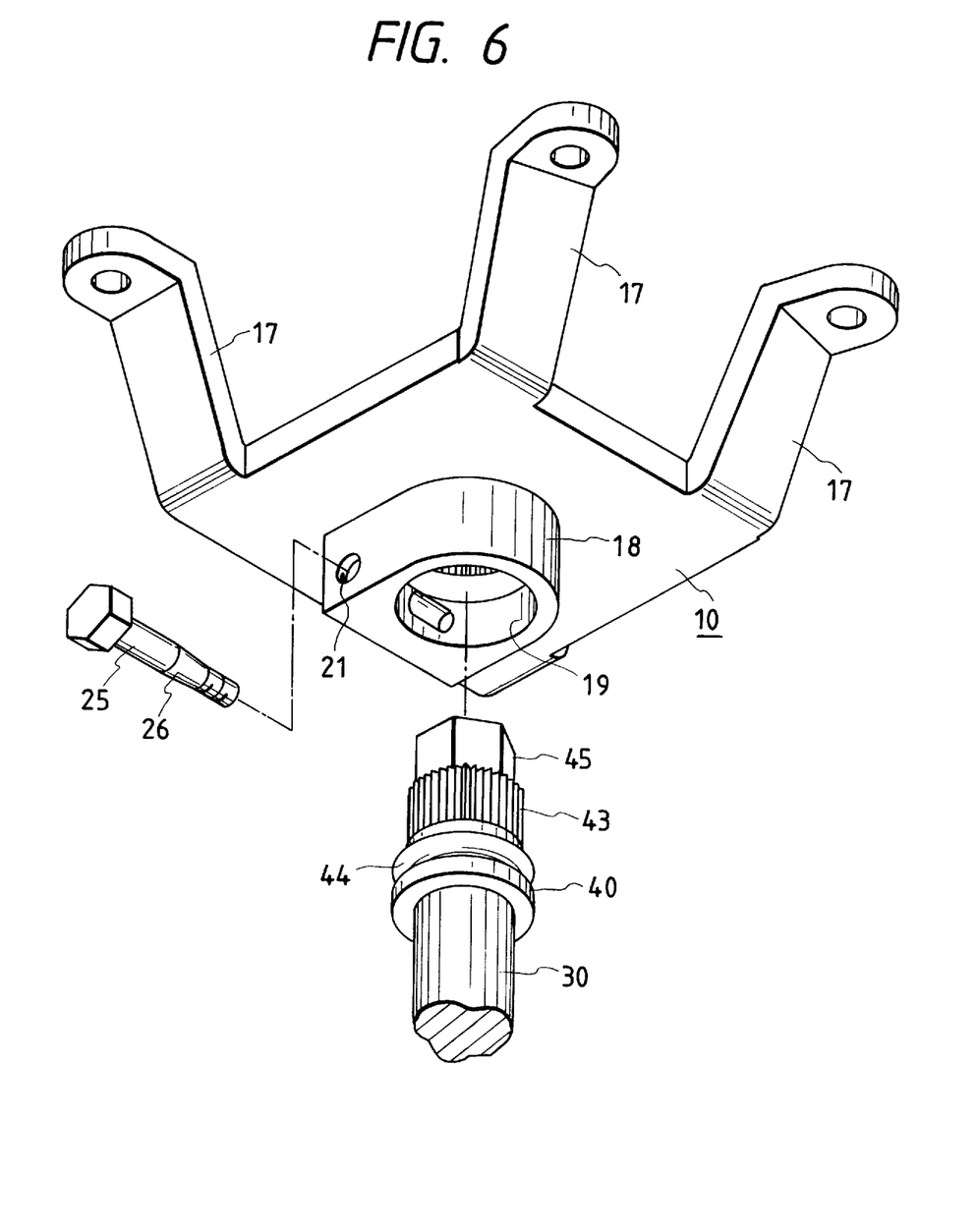
FIG. 6 is an exploded perspective view of the boss plate and its peripheral unit as viewed from below.

The boss plate 10 is made of lightweight diecast metal such as aluminum alloy and has an arm member 17 at four corners thereof as shown in FIGS. 5 and 6. The arm members 17 are formed slantwise in the upper direction and the spoke core 6 is coupled to the tip of each arm member 17.

As shown in FIGS. 3 and 6, moreover, a boss member 18 is projected from the central underside of the boss plate 10 and provided with a steering-wheel receiving hole 19 vertically passing therethrough. The receiving hole 19 has a serration 20 corresponding to the outside serration 43; that is, the serration 20 has the same number of teeth as that of the outside serration 43 of the adaptor 40.

As shown in FIGS. 3 and 6, moreover, a through-hole 21 extends in a direction perpendicular to the axial direction of the steering shaft 30. Further, a tapered surface 22 is formed axially and in the substantially central portion of the through-hole 21 and a female thread 23 is formed on the other (tapered) side of the tapered surface. The central portion of the through-hole 21 is open or communicates with the receiving hole 19. The position where the through-hole 21 is formed in the vertical direction of the steering wheel W conforms to the position where the annular depression 44 of the adaptor 40 is formed.

Further, numeral 25 designates a bolt to be screwed into the through-hole 21 and the bolt 25 has a tapered surface 26 corresponding to the tapered surface 22 of the through-hole 21. According to this embodiment of the invention, the through-hole 21 and the bolt 25 are equivalent to a fastening means for fastening the steering wheel W to the steering shaft 30.

A description will subsequently be given of a method of mounting the steering wheel W on the steering shaft 30. When the steering wheel W is mounted on the steering shaft 30, it is assumed that the membrane switch 12 and the air bag device 13 have already been contained in the steering wheel body 1 and that the boss plate 10 has also been fixed to the spoke cores 6.

First, the adaptor 40 is put on the leading end portion of the steering shaft 30. At this time, the serration 32 of the steering shaft 30 is made to engage with the inside serration 41 of the adaptor 40. Then the nut 45 is screwed onto the male thread 31 of the steering shaft 30 in this condition so as to fix the adaptor 40 to the steering shaft 30.

Further, the leading end portion of the steering shaft 30 is fitted into the receiving hole 19 of the boss plate 10. At this time, the serration 20 formed in the receiving hole 19 is made to engage with the outside serration 43 of the adaptor 40 so that the rotational position of the steering wheel W thus mounted may properly be adjusted. The nut 45 that has been screwed onto the leading end portion of the steering shaft 30 is projected from the surface of the boss plate 10 in this condition.

Then, the bolt 25 is screwed into the through-hole 21 of the boss plate 10. Since the bolt 25 is retained in the annular depression 44 of the adaptor 40 at this time, the position of the boss plate 10 is fixed with respect to the adaptor 40. As shown in FIG. 4, moreover, the tapered surface 26 of the bolt 25 pushes the annular depression 44 of the adaptor 40 in the direction of an arrow and the pressing force of the adaptor 40 against the inner peripheral surface of the receiving hole 19 increases to ensure that the boss plate 10 is secured accordingly.

According to this embodiment of the invention, the following effect is achievable.

In other words, the boss member 18 of the boss plate 10 is provided with the through-hole 21 extending in a direction perpendicular to the axial direction of the steering shaft 30, and the bolt 25 is screwed into the through-hole 21, whereby part of the shaft portion of the steering shaft 30 is fastened according to this embodiment of the invention. Therefore, the boss plate 10 is not fastened onto the steering shaft 30 from above the boss plate 10 but is fastened from below the boss plate 10, and the steering wheel W integrally incorporating not only the covering materials 7a, 7b of the ring core 5 and the spoke cores 6 but also the pad member 3 can readily and surely be mounted on the steering shaft 30.

Further, the adaptor 40 having, on its inner peripheral surface, the inside serration 41 engaging with the serration 32 of the steering shaft 30 and also on its outer peripheral surface, the outside serration 43 engaging with the serration 20 of the boss member 18 is fitted to the leading end portion of the steering shaft 30. It is therefore possible to combine the steering shaft 30 and the boss plate 10 having serrations different in the number of teeth from each other, so that component parts for common use are adaptable to meet various specification requirements at a lower cost. Particularly according to this embodiment of the invention, the number of teeth of the serration 32 of the steering shaft 30 can be set to what has generally been materialized (approximately 30 teeth), whereas the number of teeth of the serration 20 of the boss member 18 can substantially be doubled. In this case, fine adjustment of an angle in the direction in which the steering wheel W is rotated can be made possible by increasing the number of teeth of the serration 20 of the boss member 18 when the steering wheel W is mounted.

Further, the annular depression 44 is provided in the outer peripheral surface of the adaptor 40 and made to retain the bolt 25 to be screwed into the through-hole 21 of the boss member 18, whereby the steering wheel W is prevented from coming off or producing looseness of joints.

According to this embodiment of the invention, further, the tapered surface 26 of the bolt 25 is caused to push the annular depression 44 of the adaptor 40 in one direction to ensure that the steering wheel W is prevented from producing looseness of joints.

2nd Embodiment

Figure 9:
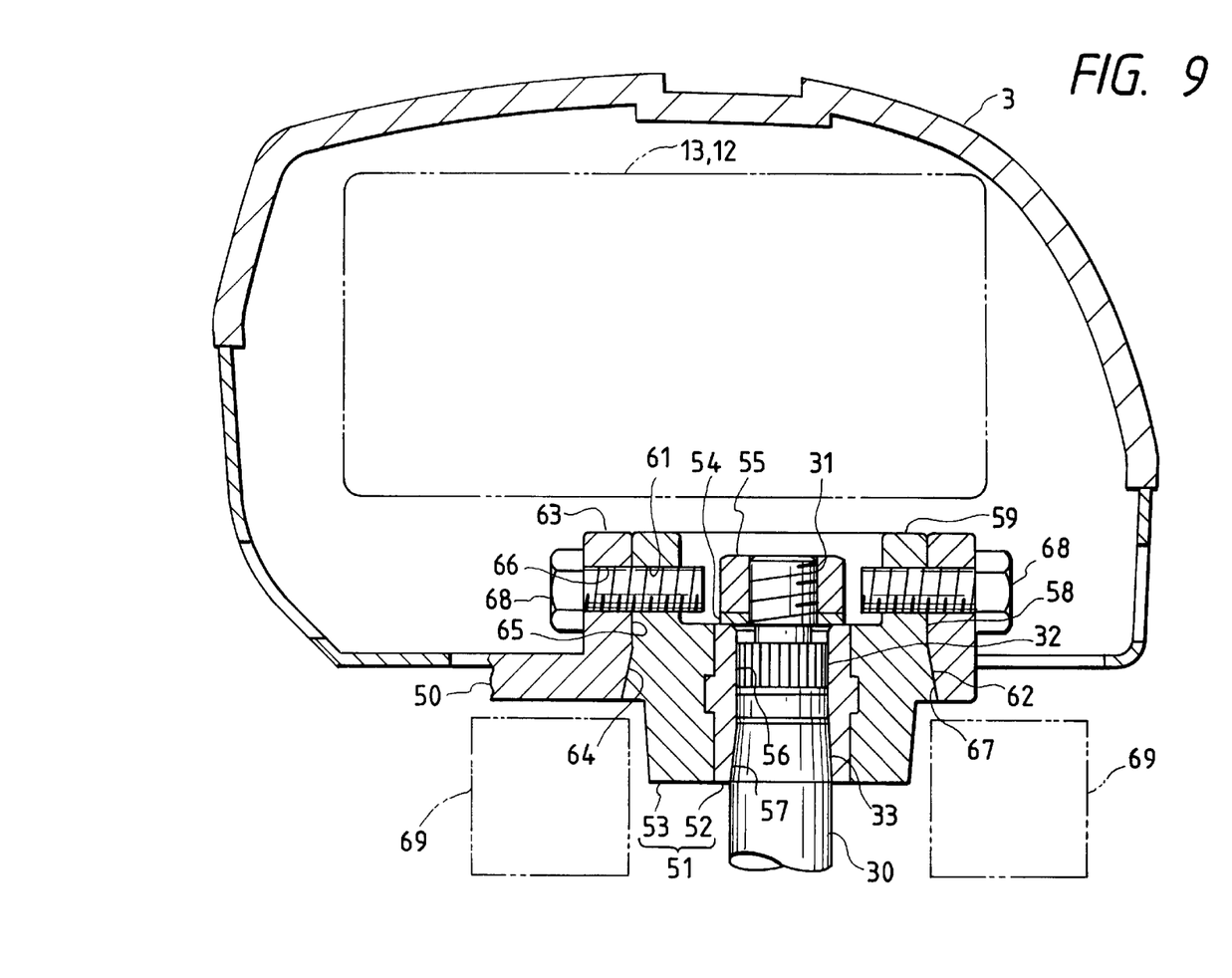
FIG. 9 is a sectional view taken along line IX—IX of FIG. 8.
Figure 10:
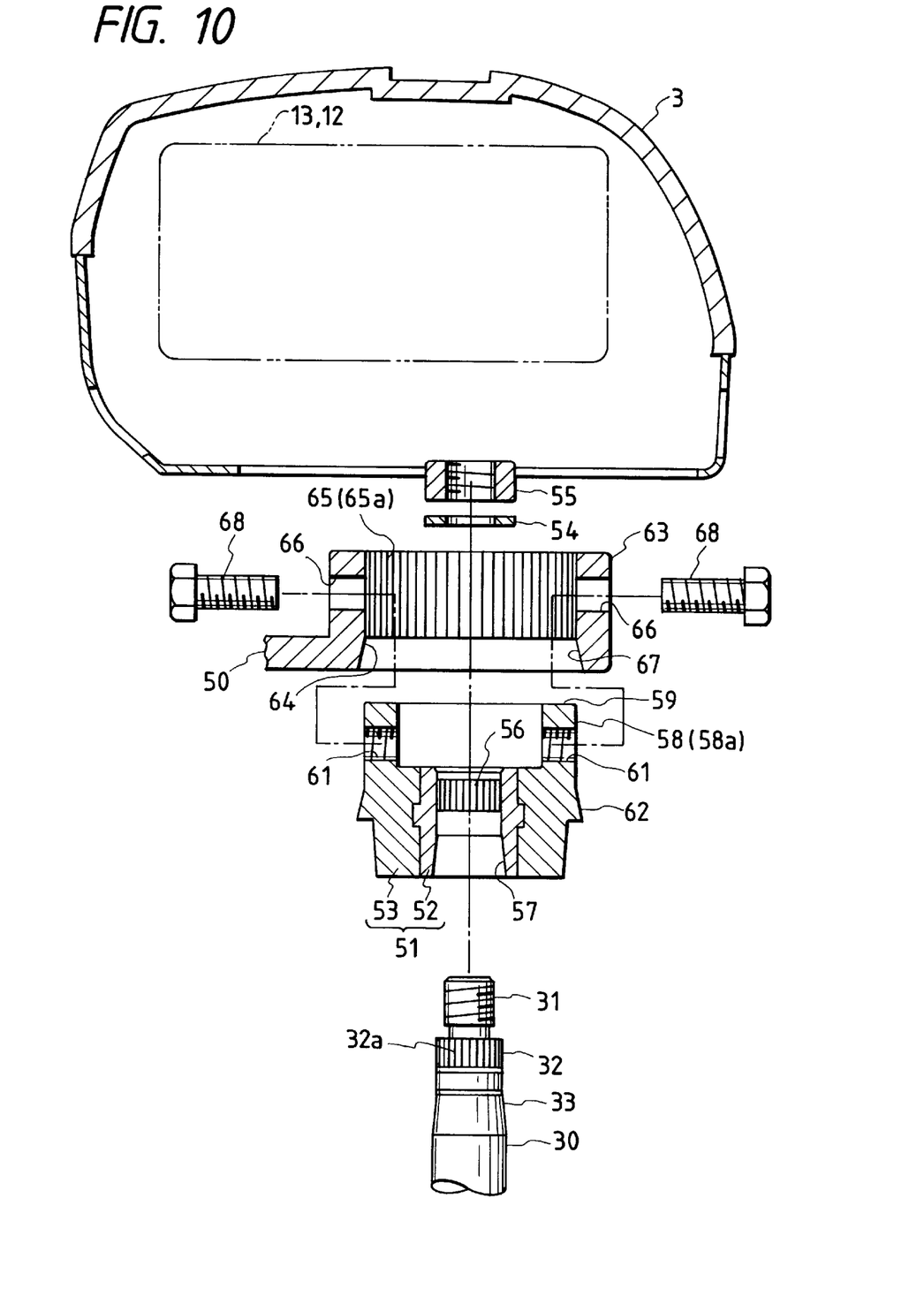
FIG. 10 is a sectional view of the principal part of the steering wheel of FIG. 9.

A description will subsequently be given of a second embodiment of the present invention with reference to FIGS. 8–10. Like reference characters designate like and corresponding members and the description thereof will be omitted. However, the description given below will be centered upon mainly points of difference between the first and second embodiments of the present invention.

Figure 8:
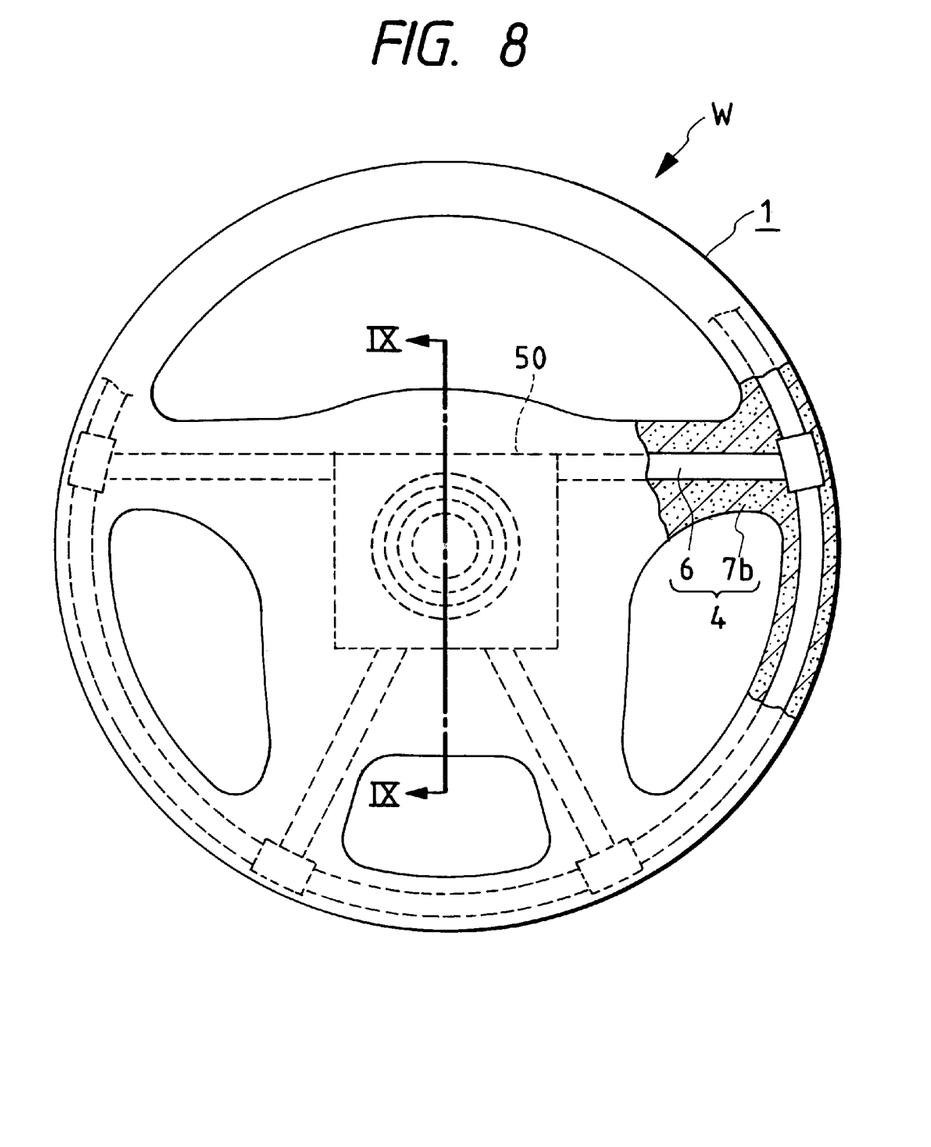
FIG. 8 is a plan view of a steering wheel to which a second embodiment of the present invention is applied.

FIG. 8 is a plan view of the steering wheel W according to this embodiment of the invention; FIG. 9 is a sectional view taken along line IX—IX of FIG. 8; and FIG. 10 an exploded sectional view of the principal part of the steering wheel W of FIG. 8.

Even according to this embodiment of the invention, a boss plate 50 is fixed to the flat portion of the spoke core 6 with a screw or the like, though not shown. As shown in FIGS. 9 and 10, further, the male thread 31 is formed at the tip of the steering shaft 30 and the serration 32 as well as the tapered surface 33 is formed thereunder. Further, the serration 32 of the steering shaft 30 has a predetermined number of teeth 32a (generally, about 30 teeth). In these respects, the arrangement of this embodiment of the invention is substantially similar to that of the first embodiment thereof.

Further, the tip of the steering shaft 30 is fitted into an adaptor 51. The adaptor 51 is formed of a steel portion 52 located on the inner peripheral side and an aluminum portion 53 made of diecast aluminum and located on the outer peripheral side. These being portions are integral with each other. As in the first embodiment of the present invention, the adaptor 51 is also fixed by means of a nut 55 screwed via a packing 54 into the male thread 31.

A serration 56 and a tapered surface 57 respectively corresponding to the serration 32 and tapered surface 33 of the steering shaft 30 are formed on the inner peripheral surface of the adaptor 51 (the steel portion 52). Further, the outer peripheral surface of the adaptor 51 (the aluminum portion 53) is formed with a serration 58 having more teeth 58a (the number of teeth=about 60) than the serration 32 of the steering shaft 30. Incidentally, the serration 56 on the inner peripheral surface of the adaptor 51 will be hereinafter called an inside serration, and the serration 58 on the outer peripheral surface thereof an outside serration.

Unlike the first embodiment of the present invention, no annular depression 44 is provided for the adaptor 51. An annular projection 59 is integrally formed on the adaptor 51 instead and a female thread 61 is formed in two opposite places of the annular projection 59. Further, a tapered surface 62 which becomes gradually greater in diameter toward the lower side is provided in the outer peripheral lower portion of the adaptor 51 instead of the provision of the outside serration 58.

A boss member 63 is integrally formed in the substantially central portion of the boss plate 50 and is provided with a steering-shaft receiving hole 64 vertically passing therethrough. A serration 65 corresponding to the outside serration 58 of the adaptor 51 is formed on the upper portion of the inner peripheral surface of the receiving hole 64; that is, the serration 65 has the same number of teeth 65a as that of the outside serration 58 of the adaptor 51.

A bolt hole 66 is formed in two places, each corresponding to the internal thread 61 of the annular projection 59, in the upper portion of the boss member 63. Further, a tapered surface 67 having a contour (which becomes greater in diameter toward the lower side) along the tapered surface 62 of the adaptor 51 is provided in the lower portion of the inner peripheral surface of the tapered surface 64 of the boss member 63. While the boss member 63 of the boss plate 50 has been fitted into the adaptor 51, the surface of the annular projection 59 of the adaptor 51 and that of the boss member 63 are substantially leveled.

Further, numeral 68 designates two bolts to be each screwed into the bolt holes 66 and the female threads 61. According to this embodiment of the invention, the bolts 68, the bolt holes 66 and the female threads 61 are equivalent to a fastening mechanism for fastening the steering wheel W to the shaft portion of the steering shaft 30. According to this embodiment of the invention, further, a relaying spiral cable 69 (FIG. 9) of the air bag device 13 is provided on the outer periphery of the steering shaft 30.

A description will subsequently given of a method of mounting the steering wheel W on the steering shaft 30.

First, the adaptor 51 is put on the leading end portion of the steering shaft 30. At this time, the serration 32 of the steering shaft 30 is made to engage with the inside serration 56 of the adaptor 51. Then, the nut 55 is screwed via the packing 54 onto the male thread 31 of the steering shaft 30 in this condition so as to fix the adaptor 51 to the steering shaft 30.

Further, the leading end portion of the steering shaft 30 is fitted into the receiving hole 64 of the boss plate 50. In other words, the boss plate 50 is fitted into the adaptor 51 in such a condition that the boss plate 50 has been fastened to the steering wheel body 1. At this time, the serration 65 formed in the receiving hole 64 is made to engage with the outside serration 58 of the adaptor 51 so that the rotational position of the steering wheel W thus mounted may properly be adjusted. Then the bolt holes 66 and the internal threads 61 are mutually set in correct alignment. Since the tapered surfaces 62, 67 are formed in the lower portion of the outer peripheral surface of the adaptor 51 and the lower portion of the inner peripheral surface of the receiving hole 64 of the boss member 63, respectively, the fitting (downward movement) of the boss plate 50 is restrained further when the boss plate 50 is fitted up to a predetermined vertical position. The shifting of the position of the boss plate 50 in the vertical direction (particularly the downward direction) is restrained because the boss plate 50 can thus be regulated.

Then the bolts 68 are inserted into the bolt holes 66 and screwed into the female threads 61 thus registered with the bolt holes 66 before being tightened, respectively. The position of the boss plate 50 with respect to the adaptor 51 is fixed through the fastening operation as described above.

According to this embodiment of the invention, the following effect equal to what has been achieved according to the first embodiment of the invention is also achievable. In addition, what is characteristic of this embodiment is as follows:

More specifically, it has been so arranged according to this embodiment of the invention that the tapered surfaces 62, 67 are formed in the lower portion of the outer peripheral surface of the adaptor 51 and the lower portion of the inner peripheral surface of the receiving hole 64 of the boss member 63, respectively. When, therefore, the boss plate 50 is fitted up to the predetermined position with respect to the adaptor 51, the fitting (downward movement of the boss plate 50) is restrained. Together with the tightening of the bolts 68 thereafter, moreover, the shifting of the position of the boss plate 50 can be restrained further.

Further, according to this embodiment of the invention, the two bolts are used for fastening purposes by providing the bolt hole 66 and the internal thread 61 in two places to ensure further that the steering wheel W can securely be held.

Unlike the first embodiment of the present invention, the annular projection 59 is provided in the upper portion of the adaptor 51 according to this embodiment of the invention, so that the steering wheel W is fastened with the bolts 68 in the relatively upper portion thereof. Therefore, the steering wheel W can be mounted without interfering with the arrangement of the spiral cable 69 of the air bag device 13 in the case where such a relaying spiral cable 69 is provided on the outer periphery of the steering shaft 30. The workability is thus improved further.

In addition the foregoing embodiments, the present invention may be embodied as follows:

(1) Although the annular depression 44 formed in the adaptor 40 is arcuate in cross-section according to the first embodiment of the present invention, it may be rectangular in cross section. In other words, such an annular depression may be of any shape in cross-section as long as it becomes retained by the bolt 25 and is capable of pressing the adaptor 40 in the predetermined direction.

Figures 7A, 7B:
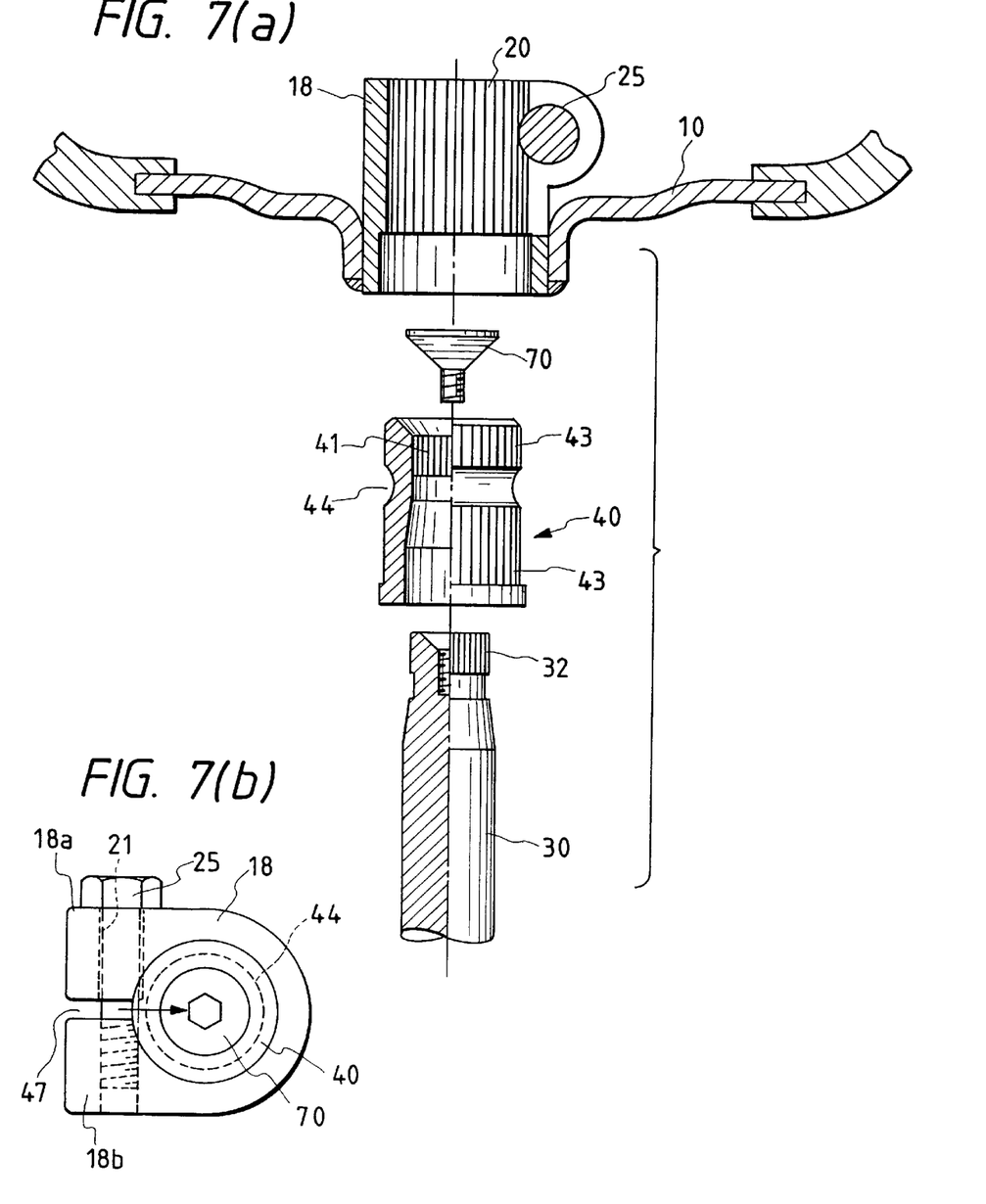
FIGS. 7(a) and 7(b) are sectional views illustrating the shape of a boss member according to another embodiment which is substantially similar to the first embodiment of the present invention.

(2) Although the boss member 18 of the boss plate 10 is formed into a substantially cylindrical and partially rectangular shape according to the first embodiment of the present invention, it may be in the form of a sleeve by omitting part of the boss member 18 and cutting the boss member 18. There is provided another embodiment in FIGS. 7(a) and 7(b). As shown in FIG. 7(a), the boss member 18 is projected from a central portion above the boss member 18 as different from that of the first and second embodiments. Further, a screw 70 is used for fixing the adaptor 40 to the steering wheel shaft 30. Furthermore, the boss member 18 includes an omitted portion 47 as shown in FIG. 7(b) defining arms 18a and 18b and the bolt 25 is screwed in such a manner as to stride over the omitted portion 47 to couple the arms 18a and 18b. In this case, the space of the omitted portion 47 is narrowed as the bolt 25 is screwed in to ensure that the steering wheel W is secured.

In this variation, the adaptor 40 has a flange 71 at a lower end thereof. The flange 71 has a diameter smaller than that of the inner diameter of the boss member 18 below step portion 72 but larger than that of the inner diameter of the boss member 18 above step portion 72 and larger than the diameter of the remainder of adaptor 40. Thus, when the adaptor 40 and boss member 18 are fitted together, the flange 71 contacts the step portion 72 to prevent the boss member 18 from sliding downward.

(3) Although the bolt 25 (fastening) has been used to fasten the outer peripheral surface according to the first embodiment of the present invention, part of the shaft portion of the steering shaft 30 may alternatively be fastened directly. In this case, a depression like the annular depression 44 may be formed in the outer peripheral surface of a steering shaft.

(4) Although the present invention has been embodied by the steering wheel W equipped with the air bag device 13 under the pad member 3 according to the first embodiment thereof, a steering wheel may be equipped with, for example, a box-like shock absorbing member in place of the air bag device 13.

(5) One or otherwise more than two bolts may be used instead of using two bolts 68 as in the case of the second embodiment of the present invention.

(6) The tapered surface 62 is provided on the lower side of the outside serration 58 on the outer peripheral surface of the adaptor 51 and the tapered surface 67 corresponding to the tapered surface 62 is provided on the lower side of the serration 65 on the inner peripheral surface of the receiving hole 64 according to the second embodiment of the present invention. On the other hand, the outside serration 58 itself may be tapered and the serration 65 itself on the inner peripheral surface of the receiving hole 64 may correspondingly be tapered.

While the invention has been described in connection with what is presently considered to be the most practical and preferred embodiment it is understood that the invention is not limited to the disclosed embodiments but, on the contrary, is intended to cover various modifications and equivalent arrangements included within the spirit and scope of the appended claims.

What is claimed is:

1. A steering wheel mounting assembly comprising:

a steering shaft;

an adaptor attached to a tip end of said steering shaft; and a steering wheel attached to said adaptor, said steering wheel comprises:

a boss plate fixed to a lower portion of a boss member; and said boss member projecting upwardly away from said boss plate, and having at least two spaced apart arms located on said boss member and spaced above said boss plate and radially away from said steering shaft; and a fixing assembly to compress said two spaced apart arms toward each other, thereby fastening said steering wheel to said steering shaft.

2. The steering wheel mounting assembly according to claim 1, wherein said boss plate includes a portion, projecting toward said steering shaft, to which said boss member is fixed.

3. The steering wheel mounting assembly according to claim 2, wherein:

said fixing assembly is a bolt coupling said arms; and said adaptor has a depression retaining said bolt.

4. The steering wheel mounting assembly according to claim 3, wherein:

said steering shaft has a shaft serration on an outer surface thereof; and said adaptor has a inner serration on an inner surface thereof and arranged to engage with said shaft serration.

5. The steering wheel mounting assembly according to claim 3, wherein:

said boss member has a boss serration on an inner surface thereof; and said adaptor has a outer serration on an outer surface thereof for engaging said boss serration.

6. The steering wheel mounting assembly according to claim 3, wherein:

said adaptor includes a flange having a larger diameter; and said flange contacts said boss member to prevent said steering wheel from moving toward said steering shaft.

* * * * *